March 23, 1971   D. W. PHILBRICK   3,572,357
ENGINE MONITORING SYSTEM EMPLOYING FLUIDIC CIRCUITRY
Filed Dec. 10, 1968   2 Sheets-Sheet 1

INVENTOR
DANIEL W. PHILBRICK

BY
Christen, Sabol & O'Brien
ATTORNEYS

March 23, 1971  D. W. PHILBRICK  3,572,357
ENGINE MONITORING SYSTEM EMPLOYING FLUIDIC CIRCUITRY
Filed Dec. 10, 1968  2 Sheets-Sheet 2

INVENTOR
DANIEL W. PHILBRICK

BY
Christen, Sabol & O'Brien
ATTORNEYS

United States Patent Office

3,572,357
Patented Mar. 23, 1971

3,572,357
ENGINE MONITORING SYSTEM EMPLOYING
FLUIDIC CIRCUITRY
Daniel W. Philbrick, Phoenixville, Pa., assignor to
Robertshaw Controls Company, Richmond, Va.
Filed Dec. 10, 1968, Ser. No. 782,695
Int. Cl. F15c 1/12
U.S. Cl. 137—81.5                                      10 Claims

ABSTRACT OF THE DISCLOSURE

A monitoring system employing interconnected fluidic logic elements operatively associated with a plurality of pneumatic transmitters that sense the condition of safety parameters of a gas engine. Logic elements include a first and second fluidic amplifier and a series of fluidic sensors using the back pressure principle to selectively deflect a power stream between two output channels. The first amplifier combines the outputs of the series of sensors into a single output signal, while the second amplifier enables lock-out signals to be imposed on the circuit.

BACKGROUND OF THE INVENTION

(1) Field of the invention

The instant invention relates generally to monitoring systems for gas engines or the like, and more particularly to a pure fluid logic circuit that cooperates with a plurality of pneumatic transmitters to monitor the condition of sundry parameters of engine operation, such as temperature, pressure, revolutions per minute and the like.

(2) Description of the prior art

The fluid logic circuitry of the present invention is far superior to known electronic monitoring systems which perform the same function in that electronic components suffer from the disadvantages of being relatively delicate, sensitive to environmental conditions and expensive to purchase and difficult to install and maintain in operating condition.

Known mechanical monitoring systems have moving parts with resultant high inertia characteristics and are susceptible to malfunctions caused by sticking.

SUMMARY

Thus, with the shortcomings of known monitoring systems enumerated above in mind, one of the major objects of the instant invention is to provide a highly efficient, inexpensive and reliable system combining pneumatic transmitters and fluidic circuitry without moving parts for monitoring a plurality of parameters indicative of engine operation.

Another object is to provide fluid logic circuitry that employs fewer elements than any other fluidic circuit capable of performing the same functions, thus minimizing the power consumption of the circuit.

Yet another object is to provide a fluid logic circuitry which performs the logical OR-NOR function.

Still another object is to provide a versatile fluidic circuit wherein the fluidic sensors can be locked out of the circuit during unstable periods of engine operation.

The above objects are achieved by fluid logic circuitry utilizing a first and a second OR-NOR fluidic amplifier and a plurality of fluidic sensors operating on the back pressure principle. Each fluidic sensor includes a sensor leg that communicates with a pneumatic transmitter that is responsive to the parameter of engine operation being monitored. When a variable condition exceeds the setpoint of its respective transmitter, the back pressure sensor produces a control pulse that is supplied to the first fluidic amplifier and switches same to its OR output channel. The OR output is then used to effect engine shut down. Lockout control is achieved by the provision of two additional control inputs for the fluidic sensors.

Other objects and advantages of the instant invention will become apparent in light of the following detailed description of the invention when construed in connection with the accompanying sheet of drawings.

DESCRIPTION OF THE PREFERRED EMBODIMENT

Figure 1:
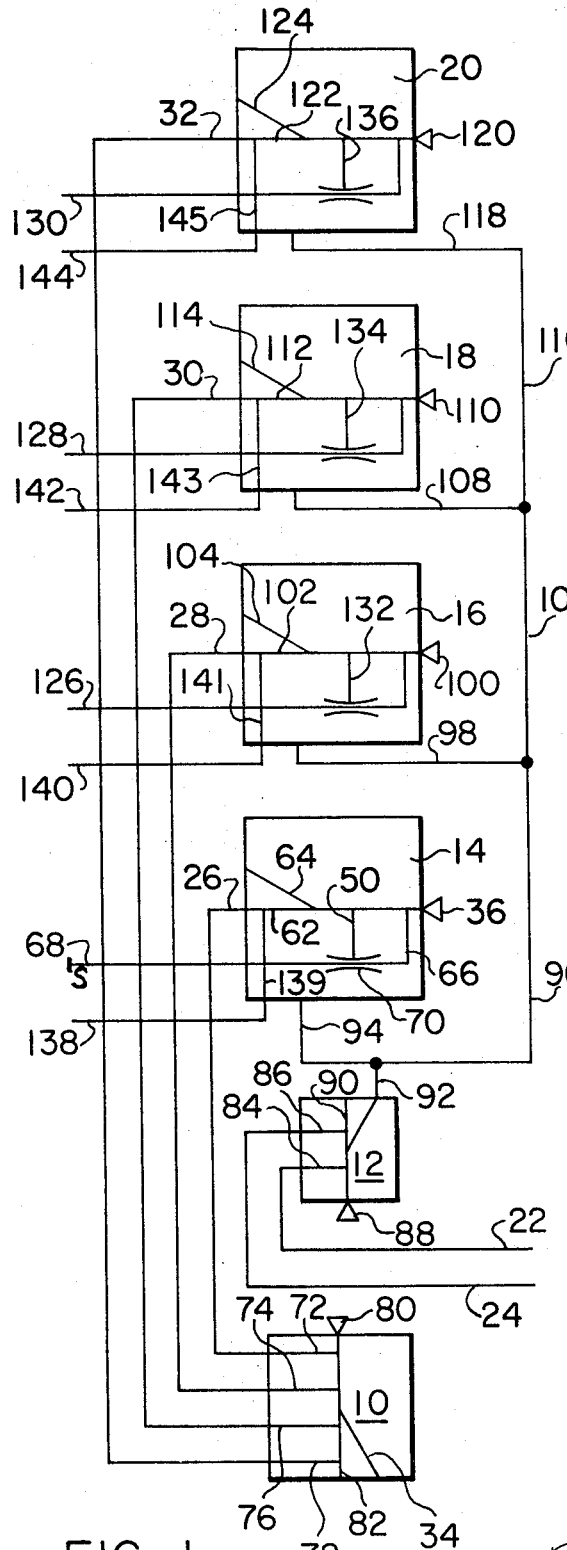
FIG. 1 is a schematic view fluidic circuit embodying the principles of the instant invention.

Referring now in greater detail to the drawings in which similar reference numerals refer to similar elements, FIG. 1 depicts a four channel fluidic circuit employing six interconnected pure-fluid logic elements, 10, 12, 14, 16, 18 and 20 which process information sensed at four separate remote locations.

The fluidic circuit of FIG. 1 employs four identical fluidic sensors 14, 16, 18 and 20 for this number represents the maximum fan-out capability of logic element 12, i.e., the number of similar downstream logic elements that can be effectively switched by an output signal from element 12. Furthermore, four represents the maximum number of control channels to which logic element 10 can respond satisfactorily upon receiving a signal at one or more of said channels.

In light of these factors, the utilization of more than four fluidic sensors within a circuit would require additional logic elements, such as logic elements 10 and 12, to handle the increased input and output collection functions. Conversely, a reduction to less than four sensors per circuit would under utilize the capabilities of logic elements 10 and 12. Therefore, for optimum efficiency, a fluidic logic circuit processing information sensed at twenty remote locations would require five separate circuits with each employing four sensors therein, whereas a circuit processing information sensed at forty remote locations would require ten separate circuits with each circuit employing four sensors therein. These fluidic circuits achieve the total desired response characteristics while lowering power consumption.

A brief explanation of the function performed by each of the six fluidic logic elements of FIG. 1 is in order. Logic elements or fluidic sensors 14, 16, 18 and 20, which are monostable OR-NOR fluidic amplifiers, operate on the back-pressure principle and each amplifier is responsive to the condition sensed at its sensor leg. Logic element 12, which is also a monostable OR-NOR fluidic amplifier, permits two separate lock-out signals to be imposed on the circuit via control conduits 22 and 24. Logic elements 10, which is also a monostable OR-NOR fluidic amplifier, receives the output from fluidic sensors 14, 16, 18 and 20 via conduits 26, 28, 30 and 32, respectively, and combines these outputs into a single output issuing at output channel 34.

Figure 2:
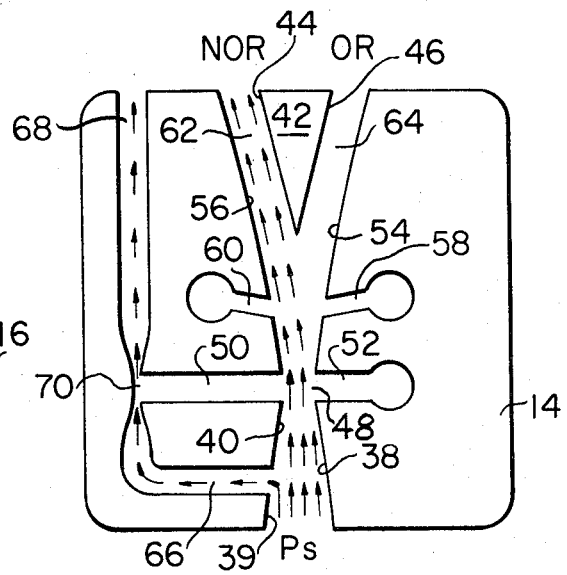
FIG. 2 is a diagrammatic view, on an enlarged scale, of a fluidic sensor employed within the circuit, of FIG. 1, such element being depicted in its stable condition.
Figure 3:
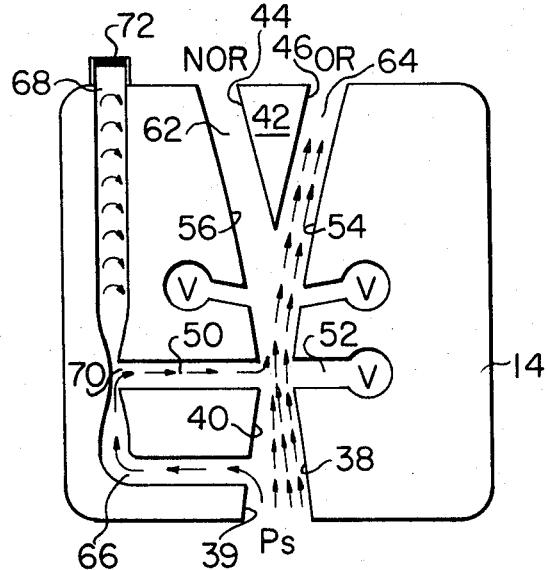
FIG. 3 is a diagrammatic view similar to FIG. 2, but showing the fluidic sensor momentarily switched to its unstable condition.

Before discussing in any further detail the structural and operational interrelationships of the circuit of FIG. 1, it is deemed best at this junction to examine the configuration of the fluidic sensors 14, 16, 18 and 20 as best seen in FIGS. 2 and 3. Since these sensors are identical in nature, only fluid logic sensor 14 is analyzed hereinafter.

FIG. 2 shows a known, commercially available fluidic back pressure sensor 14 employed within the circuit of FIG. 1. The pattern of nozzles, channels, and the sensor leg of sensor 14 is etched from a first layer of non-porous material and is covered by an overlayer of non-porous material in a sandwichlike fashion (not shown). Sensor 14 comprises a power nozzle 36 defined by converging right sidewall 38 and left sidewall segments 39, 40. A triangular flow divider 42 with diverging sidewalls 44 and 46 is disposed downstream of, and in alignment with, nozzle 36.

An interaction region 48 is formed just downstream of nozzle 36 by the confluence of control channel 50 and the main channel containing the power stream. Pressure vent 52 is located at the opposite side of interaction region 48, in alignment with control channel 50.

Right sidewall 54 curves gradually outwardly downstream of control channel 50 and left sidewall 56 curves gradually outwardly downstream of control channel 50. Right sidewall 54 is interrupted upstream of the apex of flow divider 42 by a vent channel 58 while left sidewall 56 is interrupted at the same location by a vent channel 60. Vent channels 52, 58 and 60 are necessary to maintain a constant flow through the fluidic sensor over the range of pressures to which the sensor will be subjected.

Left sidewall 56 and wall 44 of flow divider 42 define a first output channel 62 therebetween. Right sidewall 54 and wall 46 of flow divider 42 define a second output passage 64 therebetween. For purposes of discussing the logic employed within the circuit, channel 62 is designated by an appropriate legend as the NOR channel while channel 64 is similarly designated as the OR output channel. The designation OR-NOR in logical parlance signifies that the sensor is monostable in operation and that the power stream will exhaust through the NOR output channel in the absence of a control signal switch in the stream. The power stream, when deflected, will exhaust through the OR output channel for a period of time equal to the duration of the control signal.

Fluidic sensor 14 operates on the back pressure principle and therefore includes a substantially L-shaped sensor leg. The sensor leg determines whether the fluid stream emanating from the power source $P_s$ will exit from NOR output channel 62, or will be deflected temporarily to OR output channel 64. The sensor leg comprises a short horizontal section 66 that communicates with the power source through an opening in the left sidewall of nozzle 36 intermediate sidewall segments 39 and 40. Section 66 merges into vertical output section 68, to complete the sensor leg as identified by the legend S; a throat 70 of reduced dimensions, or a venturi restriction, is formed in output section 68 in alignment with control channel 50 and interaction region 48.

The manner in which the above described representation fluidic sensor 14 functions is now described with reference to FIGS. 2 and 3. It should be recognized too that the fluidic sensor operates on the beam deflection principle to perform the logical OR-NOR functions. The beam deflection principle refers to the ability of the deflected power stream exclusively to maintain its integrity while being deflected from one output channel to another as the result of impinging control signals.

FIG. 2 shows fluidic sensor 14 in its normal or stable condition with L-shaped sensor leg 66, 68 unblocked. Due to the geometry of sensor 14, the flow issuing from power source $P_s$ passes through power nozzle 36, through interaction region 48, and exits through NOR output channel 62 in the absence of a control signal. A minor portion of the flow issuing from power source $P_s$ peels away from the power stream and passed through section 66, through restriction 70 and output section 68 to port S and is then vented to the atmosphere. With port S at the extreme end of the sensor leg open to the atmosphere, the venturi 70 pulls a slight vacuum in channel 50. The purpose of the venturi 70 is to permit any line length to be attached to channel 68; thus, the restrictive nature of a long length of line will not appear as a signal at channel 50 and the power stream assumes its stable state and flows through NOR output channel 62. The directional arrows in FIG. 2 indicate both the direction of the fluid flow through sensor 14 and approximate the magnitude of the mass of such flow.

FIG. 3 illustrates the manner in which sensor 14 functions when the sensor port S at the extreme end of the sensor leg 66, 68 is blocked by load 72. Load 72 may assume numerous forms, such as an obstruction situated downstream of the output port S of the sensor leg, a fluid pressure signal opposing the fluid flow at the output port, a piston, a closed valve, a closed pneumatic transmitter, etc. The presence of load 72 causes a back pressure to build up in channel section 68 of sufficient magnitude to pressurize control channel 50, and issue a signal therefrom. Such signal impinges upon the power stream in the interaction region 48 and causes the power stream to switch from NOR output channel 62 to the OR output channel 64. The directional arrows in FIG. 3 indicate both the direction of the fluid flow through sensor 14 and approximate the magnitude of the mass of such flow. As soon as load 72 is removed from the output port of sensor leg 66, 68, the main power stream will return to its stable state and exit from NOR output channel 62 due to the internal geometry and memory characteristics of the sensor. As previously noted, sensors 16, 18 and 20 function in the same manner as sensor 14.

Referring back again to the fluidic circuit of FIG. 1, the circuit is completed by fluidic logic elements 10 and 12, which are generally similar to the previously described OR-NOR sensors 14, 16, 18 and 20. Logic element 10 is characterized as a monostable OR-NOR pure fluid amplifier with four control channels 72, 74, 76 and 78 disposed on one side of the power stream issuing from power nozzle 80. Due to the internal geometry of amplifier 10 and in the absence of any signals supplied over conduits 26, 28, 30 and 32, to their respective control channel, the power stream will pass through element 10 and exhaust to atmosphere at the NOR output channel 82.

When a control signal is issued at any one, or more of the control channels, the power stream will be deflected and will exit at OR output channel 34 for the duration of the control signal.

Logic element 12 is characterized as a monostable OR-NOR pure fluid amplifier with two control channels 84 and 86 disposed on one side of the power stream issuing from nozzle 88. Due to the internal geometry of amplifier 12 and in the absence of any control signals supplied over control conduits 22 and 24, the power stream will pass undeflected through element 12 and exit at the NOR output channel 90. In the presence of a control signal at either one, or both, of the control channels, the power stream will be deflected and will exit at OR output channel 92.

The fluid flow received at OR output channel 92 of fluid amplifier 12 is then transmitted downstream in parallel fashion to control fluid sensors 14, 16, 18 and 20 via appropriate fluid conduits shown in FIG. 1. Thus, channel 92 pressurizes input conduit 94 which causes a signal to issue from an appropriate control channel (not shown) on sensor 14. The control signal impinges upon the main power stream issuing from power nozzle 36 and temporarily deflects the stream from NOR output channel 62 to OR output channel 64.

The OR output channel 92 functions to avoid the issue of a signal from channel 34 under unstable conditions. Such lockout would occur prior to the unblocking of the sensor legs and henceforth, no signal would go to element 10 under any condition except a valid unblocking of the sensor legs in the absence of any lockout.

The fluid flow received at OR output channel 92 of amplifier 12 pressurizes input conduits 96 and 98 to cause a control channel (not shown) of sensor 16 to issue a control signal. Such signal impinges upon the main power stream issuing from power nozzle 100 and deflects the stream from NOR output channel 102 or OR output channel 104. The OR output channel 104 functions like 92 as mentioned above to lockout any signal from channel 34 during unstable conditions.

The fluid flow received at OR output channel 92 of amplifier 12 also simultaneously pressurizes input conduits 96, 106 and 108 to cause a control channel (not shown) of sensor 18 to issue a control signal. Such signal impinges upon the main power stream issuing from power nozzle 110 and deflects the stream from NOR output channel 112 to OR output channel 114. The OR output channel 114 functions like 92 as mentoined above to lockout any signal from channel 34 during unstable conditions.

The fluid flow received at OR output chanel of amplifier 12 also simultaneously pressurizes input conduits 96, 106, 116 and 118 to cause a control channel (not shown) of sensor 20 to issue a control signal. Once again such signal impinges upon the main power stream issuing from power nozzle 120 and deflects the stream from NOR output channel 122 to OR output channel 124. The OR output channel 124 functions like 92 as mentioned above to lockout any signal form channel 34 during unstable conditions.

The L-shaped sensor leg of fluidic sensor 14 is indicated by the numerals 66, 68 and 70, while reference numerals 126, 128, and 130 indicate the respective sensor legs of fluidic sensors 16, 18 and 20. The imposition of a load on legs 126, 128 and 130 causes a back pressure to build up in the vertical section of such legs. Such pressure causes a control pulse to issue from the respective control channel 50, 132, 134 and 136 in communciation with the sensor leg. The control pulse then switches the power stream of the fluidic sensor from the NOR output channel to the OR output channel. The fluidic circuit of FIG. 1 is completed by the provision of yet another control channel for each fluidic sensor. This control channel enables each sensor to be individually locked-out of the fluidic circuit.

Thus, fluid sensor 14 includes a control conduit 138 and a related control channel 139, fluid sensor 16 includes control conduit 140 and a related control channel 141, fluid sensor 18 includes control conduit 142 and a related control channel 143 and fluid sensor 20 includes control conduit 144 and a related control channel 145. These control channels perform the same function as the previously described control channels, namely, a fluid signal issued by these conduits, impinges upon the power stream and deflects the power stream from the NOR output channel to the OR output channel.

Upon the termination of the control pulse, the internal geometry of the fluidic sensor causes the power stream to return to its stable condition and exit through the NOR output channel. Furthermore, fluidic sensors 16, 18 and 20 are also provided with pressure vents (not shown), similar to vents 52, 58 and 60 (see FIGS. 2 and 3) that enhance the stability of the power stream under all pressure conditions.

Figure 4:
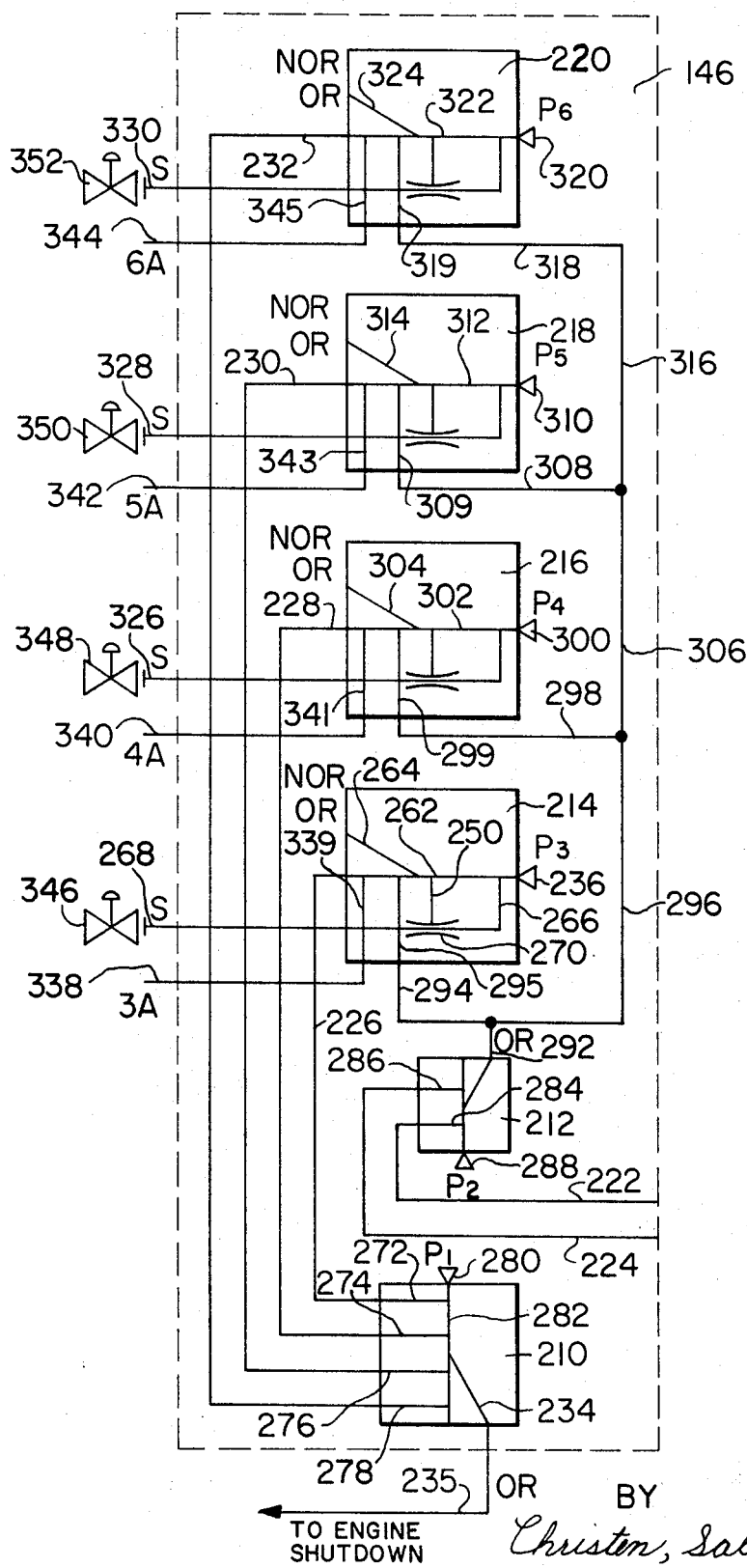
FIG. 4 is a schematic view of a system utilized to monitor the performance of an engine, such system including a combination of pneumatic transmitters and fluidic logic circuitry.

FIG. 4 shows the manner in which the fluidic circuitry of FIG. 1 employing therein the back pressure fluidic sensors of FIGS. 2 and 3 is combined with pneumatic transmitters to monitor the performance of a gas engine. The fluidic circuitry of FIG. 4 is enclosed within the chain line confines of the housing 146. For purposes of clarity in recognizing the similarities in structural relationships and functional characteristics between the fluidic circuits of FIGS. 1 and 4, similar elements appearing in FIG. 4 will bear the numerical prefix of 200. Thus, fluid amplifier 10 of FIG. 1 finds its counterpart in fluid amplifier 210 of FIG. 4, while the fluid amplifier 12, fluidic sensor 14 and control conduit 144 of FIG. 1 find their counterparts in fluid amplifier 212, fluidic sensor 214 and control conduit 344. FIG. 4 differs from FIG. 1 in that the former circuit is operatively associated with four pneumatic transmitters indicated by reference numerals 346, 348, 350 and 352.

Pneumatic transmitter 346 is disposed at the downstream end of sensor leg 268 of fluid sensor 214, pneumatic transmitter 348 is disposed at the downstream end of sensor leg 326 of fluidic sensor 216, pneumatic transmitter 350 is disposed at the downstream end of sensor leg 328 of fluidic sensor 218 and pneumatic transmitter 352 is disposed at the downstream end of sensor leg 330 of fluidic sensor 220. Pneumatic transmitters 346, 348, 350 and 352 may assume various known configurations such as single pipe or double pipe transmitters, each transmitter is adjusted so that its setpoint corresponds to the upper limit of safe operation for the parameter of engine operation being monitored. Accordingly, each transmitter is operatively associated with a different aspect of engine performance so as to monitor temperature, pressure, revolutions per minute or some other parameter of engine operation. When the monitored variables are within the prescribed limitations or ranges for safe engine operation, the transmitters keep the respective sensor legs 268, 326, 328 and 330 blocked and, hence, the fluidic sensors 214, 216, 218 and 220 have their power streams switched to the OR output channel.

When one of the variables exceeds the setpoint of one of the four transmitters, such transmitter opens to admit fluid flow from the associated sensor leg to pass freely through the transmitter and exhaust to atmosphere. The removal of the load from the sensor leg causes the fluidic sensor to return to its NOR output channel, or stable condition. In turn, the presence of a fluid output stream at the NOR output channel is fed back via appropriate conduits to control channels on amplifier 210 and switches the power stream of the amplifier to its OR output channel 234. The fluid flow received at OR output channel 234 is then used to effectuate engine shutdown, as indicated by the appropriate legend in FIG. 4 and, if so desired, can sound an alarm.

Furthermore, two position indicators, such as the 81200 Series pneumatic indicators made by Robertshaw Controls Company, can be operatively associated with the sensor leg and NOR output channel of the fluidic pressure sensors to provide a continuous read-out of the condition of each transmitter. Alternatively, light-weight indicator tabs or balls may be disposed downstream of the sensor leg and NOR output to provide a continuous read-out function. Suitable indicating tabs are disclosed in Pat. No. 3,001,698 granted to R. W. Warren and suitable ball indicators are disclosed in Pat. No. 3,305,171, granted to E. R. Phillips et al.

The cycle of operation of the engine monitoring system of FIG. 4 is described hereinafter. Let us assume that pneumatic transmitters 346, 348, 350 and 352 are normally closed, that the six power nozzles of the fluidic elements are issuing power streams, and that the four parameters of engine performance being monitored are within the range of safe engine operation. Then fluidic sensor 214 will exhaust to atmosphere via OR output channel 264, fluidic sensor 216 will exhaust to atmosphere via OR output channel 304, fluidic sensor 218 will exhaust to atmosphere via OR output channel 314, and lastly, fluidic sensor 220 will exhaust to atmosphere via OR output channel 324.

If the variable parameter of engine performance being monitored by normally-closed pneumatic transmitter 346 exceeds the transmitter setpoint, then transmitter 346 will open and allow the sensor leg 268 of fluidic sensor 214 to vent to atmosphere, thus removing the loading from the sensor leg. The power stream $P_3$ issuing from power nozzle 236 then switches from OR output channel 264 to NOR output channel 262 and pressurizes conduit 226 which is connected to control channel 272 of fluidic amplifier 210. The issuance of a control signal from control channel 272 switches power stream $P_1$ issuing from power nozzle 280 from NOR output channel 282 to the OR output channel 234, then to conduit 235, and finally to an alarm mechanism and/or an on-off switch (not shown) that shuts down the engine.

If the variable parameter of engine performance being monitored by normally-closed, pneumatic transmitter 348 exceeds the transmitter setpoint, then transmitter 348 will open and allow the sensor leg 326 of fluidic sensor 216 to vent to atmosphere thus removing the loading from the sensor leg. The power stream $P_4$ issuing from power nozzle 300 then switches from OR output channel 304 to NOR output channel 302 and pressurizes conduit 228 which is connected to control channel 274 of fluidic amplifier 210. The issuance of a control signal from the control channel 274 switches power stream $P_1$ issuing from power nozzle 280 from NOR output channel 282 or the OR output channel 234, then to conduit 235, and then to an alarm mechanism and/or an on-off switch (not shown) that shuts down the engine. If, however, power stream $P_1$ has already been switched by a signal from control channel 272, then the second control signal from control channel 274 will reinforce the strength of the control signal.

If the variable parameter of engine performance being monitored by normally-closed, pneumatic transmitter 350 exceeds the transmitter setpoint, then transmitter 350 will open and allow the sensor leg 328 of fluidic sensor 218 to vent to atmosphere, thus removing the loading from the sensor leg. The power stream $P_5$ issuing from power nozzle 310 then switches for OR output channel 314 to NOR output channel 312 and pressurizes conduit 230 which is connected to control channel 276 of fluidic amplifier 210. The issuance of a control signal from control channel 276 switches power stream $P_1$ issuing from power nozzle 280 from NOR output channel 282 to the OR output channel 234, if the power stream has not already been deflected by a control signal from channels 272 or 274. If deflection of the power stream has already been effectuated, by a signal from control channels 272 or 274, then this additional control signal will merely reinforce the other control signals.

If the variable parameter of engine performance being monitored by the fourth normally-closed pneumatic transmitter 352 exceeds the transmitter setpoint, then transmitter 352 will open and allow the sensor leg 330 of fluidic sensor 220 to vent to atmosphere, thus removing the loading from the sensor leg. The power stream $P_6$ issuing from power nozzle 320 then switches from OR output channel 322 to NOR output channel and pressurizes conduit 232 which is connected to control channel 278 of fluidic amplifier 210. The issuance of a control signal from channel 278 switches the power stream issuing from NOR output channel 282 to OR output channel 234, if the power stream has not already been deflected by a signal from upstream control channels 272, 274 or 276. If deflection of the power stream has already been effectuated, then this additional control signal will reinforce the other control signals.

Every one of the fluidic back pressure sensors 214, 216, 218 and 220 have been altered from the configuration illustrated in FIGS. 2 and 3 by the addition of two more control channels. Such additional channels provide the fluidic circuit with the unique and essential feature of lock-out control.

Referring once again to FIG. 4, fluid amplifier 212 fans out through appropriate circuitry to all four fluidic sensors. Thus, the flow in OR output channel 292 pressurizes input conduit 294 and control channel 295 fluidic sensor 214, and pressurizes input conduit 298 and control channel 299 of fluidic sensor 216 via conduit 296. Similarly, the flow in OR output channel 292 pressurizes input conduit 308 and control channel 309 of fluidic sensor 218 via conduits 296 and 306; lastly, the flow in channel 292 pressurizes the input conduit 318 and control channel 319 of fluidic sensor 220 via conduits 296, 306 and 316.

In view of these interconnections, a signal issued by control channels 284 or 286 of fluid amplifier 212 will switch the power stream $P_2$ issuing from power nozzle 288 to OR output channel 292. Channel 292 will then pressurize input conduit 294 and control channel 295 and switch the power stream $P_3$ of fluidic sensor 214 to the OR output channel 264; similarly, the power streams $P_4$, $P_5$ and $P_6$ of fluidic sensors 216, 218, and 220, will be deflected to OR output channels 304, 314 and 322, respectively. All of the OR output channels of the fluidic sensors are vented to atmosphere, and thus no signal is supplied to fluidic amplifier 210, which remains in its stable NOR state. This operation makes all four fluids sensors insensitive to the condition of the transmitters 346, 348, 350 and 352.

A momentary control signal can be introduced over conduit 222 to control channel 284 of fluidic amplifier 212 after the supply pressure to all six power nozzles has been initiated. The signal at control channel 284 gives the sensor legs of fluidic sensors 214, 216, 218 and 220 time to fill with air and switch the power stream of each fluidic sensor to its respective OR output channel. It is noted at this point that all of the control signals utilized in this circuit typically represents 5–15 percent of the supply pressure.

A second control signal of varying duration can be introduced over conduit 224 to control channel 286 of fluidic amplifier 212 after the circuit has been pressurized. This second control signal can be used to provide lock-out of all of the fluidic sensors during such unstable periods of engine operation as start-up and shutdown.

Furthermore, each sensor can be individually locked out of the circuit by applying a control signal over input conduit 338 to control channel 339 of fluidic sensor 214, by applying a control signal over input conduit 340 to control channel 341 of fluidic sensor 216, by applying a control signal over input conduit 342 to control channel 343 of fluidic sensor 218 or by applying a control signal over input conduit 344 to control channel 345 of fluidic sensor 220. The ability to lock out individual sensors, either singly or in combination, enables one to positively identify the aspect of engine performance that is malfunctioning.

Since numerous modifications of the circuitry embodying the principles of this invention can be made without departing from the scope thereof, it is to be understood that all matters herein set forth or shown in the accompanying drawings is to be interpreted as illustrative in nature and not in a limiting sense.

What is claimed is:
1. A fluidic circuit comprising
 (a) a first fluid amplifier having an input nozzle for issuing a first power stream, a pair of output channels positioned downstream of said nozzle to selectively receive said power stream, and first control means positioned between said input nozzle and said output channels for issuing a control signal to deflect said power stream,
 (b) said first amplifier being so configured that the first power stream normally exits through a first channel of said pair of output channels,
 (c) a plurality of fluidic sensors adapted to monitor variable functions, each sensor having a second power nozzle for issuing a second power stream, a second pair of output channels positioned downstream of said second power nozzle to selectively receive said second power stream, and second control means positioned between said second power nozzle and said second pair of output channels for issuing a control signal to deflect said second power stream,
 (d) each sensor being so configured that the second power stream normally exits through a first channel of said second pair of output channels,
 (e) each sensor including a sensor leg that extends between said second power stream and the atmosphere for establishing communication therebetween,
 (f) said sensor leg further opening to said second control means for establishing communication therebetween so that when the sensor leg is blocked a back pressure forms in said second control means to deflect said second power stream to the second channel of said second pair of output channels, and (g) conduit means extending between the first channel of said second pair of output channels of each of the plurality of said sensors and said first control means of said first fluid amplifier, (h) said conduit means, when pressurized, producing a control signal at the first control means of said first amplifier of sufficient magnitude to deflect the first power stream to the second output channel of said pair of output channels.

2. The fluidic circuit of claim 1 wherein said second control means for each of said fluidic sensors comprises a plurality of control channels disposed at an angle to each of said second power streams, and further comprising lock-out means including an input conduit for each sensor for pressurizing at least one of said plurality of control channels.

3. The fluidic circuit of claim 1 wherein said first control means for said first fluid amplifier comprises a plurality of control channels disposed at one side of said first power stream, each one of said control channels connected to said conduit means.

4. The fluidic circuit of claim 1 wherein said conduit means comprises a plurality of conduits, one conduit being connected to the first channel of said second pair of output channels of each fluidic sensor to be pressurized thereby.

5. The fluidic circuit of claim 1 further comprising a plurality of pneumatic transmitters, each one of said transmitters being disposed at the downstream end of the sensor leg of each of said fluidic sensors.

6. The fluidic circuit of claim 5 wherein each of said pneumatic transmitters is normally biased into a closed condition, to cause a back pressure to build up in said sensor leg.

7. The fluidic circuit of claim 1 and further comprising lock-out means including a second fluid amplifier positioned upstream of said plurality of fluidic sensors, and connected thereto by input conduit means.

8. The fluidic circuit of claim 7 wherein said second fluid amplifier of said lock-out means has an input nozzle for issuing a third power stream, a third pair of output channels positioned downstream of said nozzle to selectively receive said third power stream, and third control means positioned between said input nozzle and said output channels for issuing a control signal to deflect said third power stream, said second amplifier being so configured that said third power stream normally exits through a first channel of said third pair of output channels.

9. The fluidic circuit of claim 8 wherein said second control means for each of said fluidic sensors includes a plurality of control channels disposed at an angle to each of said second power streams, and said input conduit means connects the second channel of said third pair of output channels with one of said control channels of each of said fluidic sensors such that each of said fluidic sensors has said second power stream deflected to the second channels of said second pair of output channels when said second fluid amplifier has said third power stream deflected to the second channel of said third pair of output channels.

10. The fluidic circuit of claim 9 wherein said lock-out means includes a plurality of lock-out conduits, each of said lock-out conduits being connected individually to another one of said plurality of control channels of said fluidic sensors.

References Cited

UNITED STATES PATENTS

| | | | |
|---|---|---|---|
| 3,228,602 | 1/1966 | Boothe | 137—815X |
| 3,232,095 | 2/1966 | Symnoski et al. | 137—815X |
| 3,302,398 | 2/1967 | Toplin et al. | 137—815X |
| 3,342,197 | 9/1967 | Phillips | 137—815 |
| 3,459,206 | 8/1969 | Dexter | 137—815 |
| 3,463,176 | 8/1969 | Lazar | 137—815X |
| 3,463,178 | 8/1969 | Kirchmier | 137—815 |
| 3,468,328 | 9/1969 | Metzger | 235—201 |

SAMUEL SCOTT, Primary Examiner